(12) United States Patent
Roths

(10) Patent No.: US 9,350,858 B1
(45) Date of Patent: May 24, 2016

(54) DEVICES, SYSTEMS, AND METHODS FOR RESPONDING TO TELEMARKETERS

(71) Applicant: Amazon Technologies, Inc., Seattle, WA (US)

(72) Inventor: Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/579,765

(22) Filed: Dec. 22, 2014

(51) Int. Cl.
*H04M 3/42* (2006.01)
*H04M 3/436* (2006.01)

(52) U.S. Cl.
CPC ........ *H04M 3/4365* (2013.01); *H04M 3/42042* (2013.01); *H04M 3/42068* (2013.01)

(58) Field of Classification Search
CPC .......... H04M 3/4365; H04M 3/42042; H04M 3/42068

USPC ................ 455/415, 414.1, 412.1, 418, 412.2, 455/550.1

See application file for complete search history.

(56) References Cited

U.S. PATENT DOCUMENTS

| | | | |
|---|---|---|---|
| 9,060,057 B1 * | 6/2015 | Danis ................ | H04M 3/42059 |
| 2004/0229600 A1 * | 11/2004 | Saez .................... | H04M 3/436 455/417 |
| 2011/0294478 A1 * | 12/2011 | Trivi .................... | H04M 3/436 455/415 |

* cited by examiner

*Primary Examiner* — Khai M Nguyen
(74) *Attorney, Agent, or Firm* — Sutherland Asbill & Brennan LLP

(57) ABSTRACT

Aspects of the disclosure provide responses from a communication device to a call from an unknown source, such as telemarketers. In certain aspects, information associated with a communication address of the unknown source can be accessed by the communication device, and a response to the call can be specific to some or all of the information. In other aspects, the responses can be automated and/or can be directed, at least in part, by external input supplied to the communication device.

17 Claims, 10 Drawing Sheets

DEVICES, SYSTEMS, AND METHODS FOR RESPONDING TO TELEMARKETERS

BACKGROUND

Telemarketing calls are quite common, even for numbers on the national do-not-call list. These calls also can use automated messages, which is in contravention of existing regulations. Telemarketers' calls may not be identified at the time of receiving the call at a communication device or other type of communication devices. Therefore, a response from the mobile device to a marketer call can be limited to pre-emptily terminating the call without answering it.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

DETAILED DESCRIPTION

The disclosure recognizes and addresses, in at least certain aspects, the issue of responding to communication calls from telemarketers and other types of unknown callers. More specifically, embodiments of the disclosure provide responses from a communication device (e.g., a smartphone) to a call from an unknown source, such as a telemarketer. In certain aspects, information associated with a communication address of the unknown source can be accessed by the communication device, and a response to the call can be specific to some or all of the information. In other aspects, the responses can be automated and/or can be directed, at least in part, by external input supplied to the communication device.

In accordance with the present disclosure, communication devices that can utilize or otherwise leverage the techniques for response to calls from unknown calling systems in accordance with this disclosure can generally include one or more processors and one or more memory devices; communication devices (e.g., a system bus, a memory bus, or the like); input/output interface(s) that can include display device(s); and/or a radio unit for wireless communication. More specifically, in one example, a communication device in accordance with this disclosure can be embodied in a tethered computing device or a portable computing device, such as a mobile tablet computer, an electronic-book reader (also referred to as an e-reader), a mobile telephone (e.g., a smartphone), and the like. In another example, the communication device can be embodied in or can comprise a wearable computing device, such as a watch, goggles or head-mounted visors, or the like. In yet another example, the communication device can be embodied in or can comprise portable consumer electronics equipment, such as a camera, a media reproduction device, a portable television set, a gaming console, a navigation device, a voice-over-internet-protocol (VoIP) telephone or two-way communication device, and the like.

Figure 1:
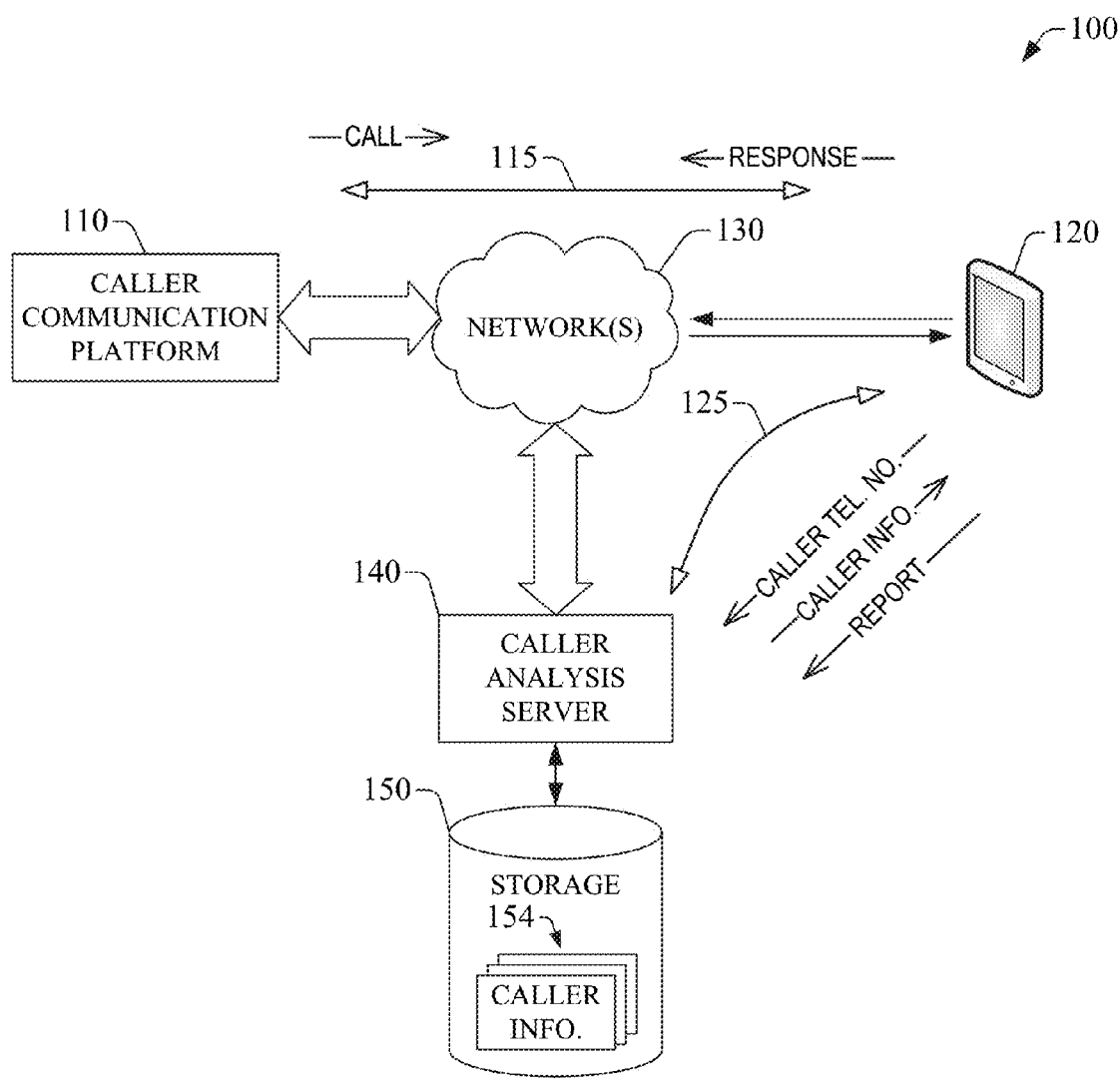
FIG. 1 illustrates an example of an operational environment in which a communication device can manage a call from an unknown caller in accordance with one or more embodiments of the disclosure.

With reference to the drawings, FIG. 1 illustrates an example operational environment 100 that can respond to a communication call (herein generally referred to as "call" or "call session") from an unknown calling system in accordance with one or more aspects of the disclosure. As illustrated, a caller communication platform 110 can initiate the communication call (labeled as "call" in FIG. 1) with a communication device 120, which is represented for the sake of illustration with a wireless smartphone, via a communication pathway 115. The communication call can be embodied in or can include a voice call or a data session implemented using a cellular radio telecommunication protocol, VoIP protocols, or protocols suitable for videotelephony. The caller communication platform 110 can be embodied in or can include any communication device, such as a predictive dialer, suitable for communication (automated or otherwise) with the communication device 120. The first communication pathway can be established via at least one network of a group of one or more networks 130, and can utilize one or more telecommunication protocols (packet-switched, circuit switched, or a combination thereof) that can exchange voice (natural and/or simulated), data, and/or signaling (e.g., tones, numeric codes, alphanumeric codes, or the like). As an example, the at least one network can include a cellular network or a portion thereof and an internet protocol (IP) multimedia subsystem (IMS) platform. The network(s) 130 can include wireless and/or wired communication networks having various footprints (e.g., a wide area network (WAN), a metropolitan area network (MAN), a local area network (LAN), a home area network (HAN), and/or a personal area network (PAN)).

As part of a communication call established between the caller communication platform 110 and the communication device 120, the communication device 120 can receive a telephone number of the caller communication platform 110. Establishing the communication call can include receiving signaling and/or payload information at the communication device 120 from the caller information platform 110, and initiating a session for exchange information (e.g., voice and/or data) between the communication device 120 and the caller communication platform 110. A portion of the received signaling and/or payload information can include a request to establish the session and, in certain embodiments, acceptance logic (e.g., response rules) may be implemented at the communication device 120 or a remote device coupled therewith in order to accept or decline the request prior to initiating such a session. The communication call can begin upon initiation of such a session, and can end in response to the communication device 120 submitting signaling (or other information) to terminate the session. Each of the communication call and the session may be referred to as a "connection." In certain scenarios, the telephone number may be unknown or otherwise unavailable to the communication device 120. For instance, the communication device 120 can determine that the telephone number is not included in an address book or other type of listing of known telephone numbers (e.g., a list of contacts). Therefore, in one example, the communication device 120 can transmit the telephone number (labeled as "caller tel. no." in FIG. 1) to a caller analysis server 140 in order to obtain caller information that can characterize the caller communication platform 110. Such information may be available in one or more storage platforms 150 (referred to as "storage 150") and, in certain embodiments, can be crowd-sourced or otherwise user-generated. In other embodiments, the caller analysis server 140 can generate at least a portion of the caller information. As illustrated, the storage 150 can include one or more memory elements 154, such as register(s), file(s), database(s), or the like, that can contain at least a portion of the caller information. As such, the one or more memory elements 154 may be referred to as "caller info. 154" (or, more generally, "caller info.") and can include data and/or metadata indicative or otherwise representative of various aspects of a caller.

The caller info. 154 that can be accessed by the caller analysis server 140 can include information that permits more than determining if a caller telephone number is associated with a telemarketer or other type of commercial entity (e.g., a debt collector or a banking representative). More specifically, in certain embodiments, at least a portion of the information can be indicative or otherwise representative of numerous aspects of operation pertaining to the caller telephone number. For example, some or all of the information can convey that automated recorded calls originate from the telephone number. For another example, some or all of the information can convey that the telephone number is associated with a specific business or commercial entity (e.g., a hospital or dentist office). For yet another example, some or all of the information can convey that the telephone number is associated with callers known to be associated with fraudulent activities or with other types of illegitimate callers as opposed to telemarketers or other types of legitimate callers. A fraudulent activity may be referred to as a scam and can include, for example, communications intended to obtain personal or other sensitive information (e.g., date of birth, social security number, parents names, or the like) from an end-user of the communication device 120 in exchange for false assets (e.g., vacations, gifts, cash payments, etc.) or false services (such as identity-theft protection). A caller associated with fraudulent activities may be referred to as a scammer. Accordingly, it can be appreciated that the information accessed or otherwise generated by the caller analysis server 140 can permit identifying potentially harmful callers or otherwise unacceptable callers. In certain embodiments, the legitimacy of a caller can be specific to the communication device 120, and certain types of callers can be legitimate or otherwise acceptable to the communication device 120 while being illegitimate or otherwise unacceptable to another communication device. For instance, the caller analysis server 140 can utilize or otherwise leverage device activity information, such as web-browsing histories, call history; activity logs, user profiles, combinations thereof, or the like, in order to determine if a caller telephone number is associated with a caller that is legitimate or otherwise acceptable to the communication device 120. The activity logs can include information indicative or otherwise representative of applications or other type of software executed or otherwise utilized at the communication device 120; information indicative of financial transactions made at or via the communication device 120; a combination thereof; or the like. As an illustration, in one implementation, the caller analysis server 140 can access at least a portion of the device activity information from the communication device 120, and can determine the legitimacy of the caller based at least on the device activity information. More specifically, the caller analysis server 140 can query or otherwise receive device activity information from the communication device and can apply one or more rules to determine a likelihood of the caller being a legitimate or otherwise acceptable caller. In certain embodiments, the caller analysis server 140 can send information indicative of such likelihood to the communication device 120, which can compare the received likelihood to a threshold in order to determine if the caller is legitimate and/or associated with an acceptable business activity—e.g., likelihood above the threshold can convey the caller is legitimate and/or associated with an acceptable business activity. In another implementation, the caller analysis server 140 can receive a list of acceptable callers (e.g., a list of telephone numbers permitted to contact the communication device 120) or a list of acceptable types of caller. Each of such lists may be referred to as a white list, and the caller analysis server 140 can compare the white list to the telephone number of a caller or a type assigned to the caller in order to determine the legitimacy of the caller.

For still another example, some or all of the information included in the caller info. 154 can convey one or more relationships between the telephone number of the caller communication platform 110 and other telephone number(s)—e.g., such information can convey that the telephone number is affiliated with other entities, such as telemarketers, scammers, and the like. For a further example, the caller analysis server 140 can receive a report from the communication device 120 or other communication devices (not depicted in FIG. 1) that can indicate that the caller telephone number is associated with a telemarketer or other types of commercial entity. As such, the caller analysis server 140 can determine or otherwise identify a group of one or more current telephone numbers, each associated with a respective telemarketer or other type of commercial entity. A telephone number in such a group can be current as of certain period (e.g., present hour, present day, present week, or the like). The caller analysis server 140 can retain or otherwise store report(s) received from a communication device within the caller info. 154. In addition or in other embodiments, the caller analysis server 140 can retain a list of current telephone numbers associated with a telemarketer or another type of commercial entity. Further or in other embodiments, the caller analysis server 140 can receive a directive or another type of instruction information to include the caller telephone number or other types of communication address associated with the telemarketer in a "do not call" list and/or a "block" list including telephone number(s) that are not permitted to establish a communication call with the communication device 120. The same list or a similar type of list can be retained or otherwise stored at a memory device in the communication device 120.

For a still further example, a portion of the caller info. 154 can include information indicative of otherwise representative of an audio signature associated with an audio segment provided (e.g., played back or otherwise transmitted) by a caller communication platform (e.g., a telemarketer platform or a communication platform for other type of commercial entity). The audio signature can include one or more of (a) information indicative or otherwise representative of a keyword, a phrase, or other type of utterance that is specific to the communication platform; (b) information indicative of otherwise representative of a spectral decomposition (e.g., a group of audible frequencies) associated with the audio segment; (c) information indicative of a compressed version of the audio segment; a combination thereof; or the like. As such, in certain embodiments, availability of audio signatures at the communication device 120 can permit determining the nature of the business activity of the caller communication platform. For instance, the communication device 120 can compare an audio signature for a caller associated with the caller telephone number with an audio input signal received during a call from the caller communication platform 110. Such a comparison can determine or otherwise identify the call from the caller communication platform 110 as being legitimate or fraudulent.

As illustrated, the caller telephone number (or other type of communication address) can be transmitted to the caller analysis server 140 via a communication pathway 125. In certain implementations, the telephone number can be transmitted after or while initiating or otherwise establishing the communication call between the caller communication platform 110 and the communication device 120, and prior to providing or otherwise implementing a response to the call by the communication device 120. It should be appreciated that while reference is made to a "telephone number" in the embodiments illustrated herein, the present disclosure is not so limited and other types of communication addresses are contemplated. As such, a communication address in accordance with this disclosure can be embodied in or can include a telephone number, a subscriber number, an international mobile subscriber identity (IMSI), an electronic serial number (ESN), an internet protocol (IP) address, a session initiation protocol (SIP) address, a uniform resource locator (URL) or other type of uniform resource identifier (URI), a media access control (MAC) address, and/or any other information that can be utilized or otherwise leveraged to identify a communication device and/or system with which to establish a communication link for the exchange of audio data, audio metadata, video data, video metadata, and/or signaling associated with such an exchange. In certain embodiments, the second communication pathway 125 can be embodied in one or more out-of-band channels available for communication within the communication protocol utilized to establish a call session between the communication device 120 and the caller analysis server 140.

The caller analysis server 140 can receive the caller telephone number associated with the caller communication platform 110, and can send at least a portion of the caller information available for the caller telephone number. The communication device 120 can receive such information (labeled as "caller info.") and can respond to the communication call from the caller communication platform 110 based at least on such information. As such, the communication device 120 can generate response information in response to the communication call from the caller communication platform 110. The response information can include, for example, tones or other type of code information that can embody or can constitute the response to the communication call. In addition or in another example, the response information can include audio output signal (e.g., an audio signal indicative of a predetermined utterance (e.g., "hello" or another keyword or phrase) or a portion of the communication call) in response to the communication call from the caller communication platform 110. In certain implementations, the audio output signal can be provided (e.g., transmitted) prior to receiving audio input signal associated with the communication call. In addition or in other implementations, the communication device 120 can transmit at least a portion of the response information to a third-party server (such as a server of a law-enforcement platform; not depicted in FIG. 1) as a record of the call and/or for analysis thereof.

In certain embodiments, the communication device 120 can retain at least a portion of the caller information that is received and/or the caller telephone number. Such information and/or the caller telephone number can be retained in a memory device integrated into the communication device 120 or functionally coupled thereto. In certain implementations, the communication device 120 can utilize or otherwise leverage device activity information, such as web-browsing histories, call history; activity logs, combinations thereof, or the like, in order to determine if the caller telephone number and/or a portion of the caller information is to be retained at the communication device 120. The activity logs can include information indicative or otherwise representative of applications or other type of software executed or otherwise utilized at the communication device 120; information indicative of financial transactions made at or via the communication device 120; a combination thereof; or the like. In one implementation, the caller telephone number and/or the portion of the caller information can be retained for a specific period prior to being removed from the memory device. In other implementations, the caller telephone number can be retained indefinitely and can be removed from the memory device in response to input information received at the communication device 110. The input information can convey a request for removal of the caller telephone number from the memory device.

In scenarios in which the caller information received from the caller analysis server 140 conveys that the caller communication platform 110 is a telemarketer or other type of commercial entity, the communication device 120 may not ring nor vibrate (or convey other type of information indicative of reception of the communication call). In addition or in other embodiments, the communication device 120 can terminate the call after initiation thereof (e.g., immediately after initiation or after a certain period). Further or in other embodiments, the communication device 120 can direct the communication call to voice-mail. In yet other embodiments, the communication device 120 can modify current settings. The ring tone/vibration settings could be changed so the user will have some clue about the trustworthiness of the caller before deciding if they want to/have time to answer.

In certain embodiments, in response to the communication call from the caller communication platform 110, the communication device 120 can generate one or more specific tones or other type of code information that can convey to the caller that the communication device 120 is disconnected from service. It should be appreciated that the communication device 120 need not be actually disconnected, but it provides a response that provides the appearance of the communication device 120 being disconnected from service. For example, the communication device 120 can generate one or more special information tones (SITs). In addition or in another example, the communication device 120 can generate audio output signal that can present the communication device 120 to the caller communication platform 110 as being disconnected. For example, the audio output signal can convey the following message: "this number has been disconnected, please check your number and try again." As a response, the communication device 120 can transmit the tone(s) or code information and/or the audio output signal to the caller communication platform 110. In certain scenarios, receiving such a response can cause the caller communication platform 110 to classify the telephone number of the communication device 120 as inactive or otherwise unavailable, and to cease to initiate communication calls with the communication device 120.

In other embodiments, a response to a communication call from the caller communication platform 110 can include an automated challenge-response message. The challenge-response message (or information) can permit to discriminate a human caller from an automated caller, and can include a challenge having a unique solution, which represents the expected response from the caller communication platform 110 or any other caller device. The challenge can be embodied in or can include, for example, a question (e.g., "who was the first president of the United States?" or "what is the capital of North Dakota?"), a riddle, a mathematical or logical problem, a combination thereof, or the like. In certain embodiments, the challenge-response message can prompt the caller to provide a response to the challenge, e.g., the caller can be instructed to use a keypad or other input device to enter the response (e.g., a number or code, a phrase, or the like). The solution associated with the challenge can be retained or otherwise stored (at least temporarily) in a memory device of the communication device 120. The communication device 120 can transmit the challenge-response message to the caller communication platform 110 via the pathway 115 prior to accepting the communication call. The challenge-response message can be transmitted, for example, as an audio output signal that can permit a device of the caller communication platform 110 to process and present the challenge-response message. The device can include (i) an audio speaker and associated circuitry that can present the challenge-response message aurally, or (ii) a speech-to-text device that can display the challenge-response message. As such, the caller communication platform 110 can receive the challenge-response message, and can provide a response to the challenge in the challenge-response message or can terminate the communication call. The communication device 120 can receive the response to the challenge and can determine if the response is correct. A correct response can cause the communication device 120 to accept or otherwise permit the communication call to proceed. An incorrect response and/or a response (correct or incorrect) received after a threshold period has elapsed can cause the communication device 120 to terminate the communication call.

In order to provide the challenge-response message, the communication device 120 can generate or otherwise access a challenge having a unique solution, as described herein, and can generate audio output signal indicative of the challenge. The audio output signal also can include, optionally, other information associated with the challenge, such as reasons for the challenge-message being provided, or steps that may be taken in the event the challenge-response message, a combination thereof, or the like. The challenge can be a mathematical challenge; a logical challenge; an aural repetition test (e.g., a request to repeat a word, a phrase, one or more sentence); a riddle; a trivia question; or any other type of problem with a unique or otherwise satisfactory solution. In certain embodiments, the complexity of the challenge can be determined based at least on a portion of the caller information received at the communication device 120. For instance, when the portion of the caller information identifies the caller communication platform 110 as a caller with a high-volume of automated calls, the complexity of challenge can be high.

The communication device 120 can report a response or an outcome to a challenge-response message to the caller analysis server 140 in order to augment the information available for the telephone number (or other type of communication address) associated with the caller communication platform 110. As an illustration, when the caller information received at the communication device 120 conveys that the caller communication platform 110 is associated with or otherwise corresponds to a solicitor or other type of commercial entity, the communication device 120 can generate a challenge-response message and audio output signal indicative or otherwise representative of such a message. As an example, in one embodiment, the challenge-response message can be embodied in or can include the following: "this number does not accept solicitations, if you are not a solicitor please state the value of 2+3." The communication device 120 can generate audio output signal indicative of such a challenge-response message and can transmit the audio output signal to the caller communication platform 110. The communication device 120 can receive audio input signal representative of a response to the challenge-response message from the caller communication platform 110, and can determine if the response is correct. Receiving the correct response ("5," in this example) can cause the communication device 120 to allow the communication call to proceed. The communication device 120 also can transmit, to the caller analysis server 140, information that can characterize the caller communication platform 110 as being associated with a human or an automated machine with speech recognition. The caller analysis server 140 can retain such information in the storage 150.

Figure 2A:
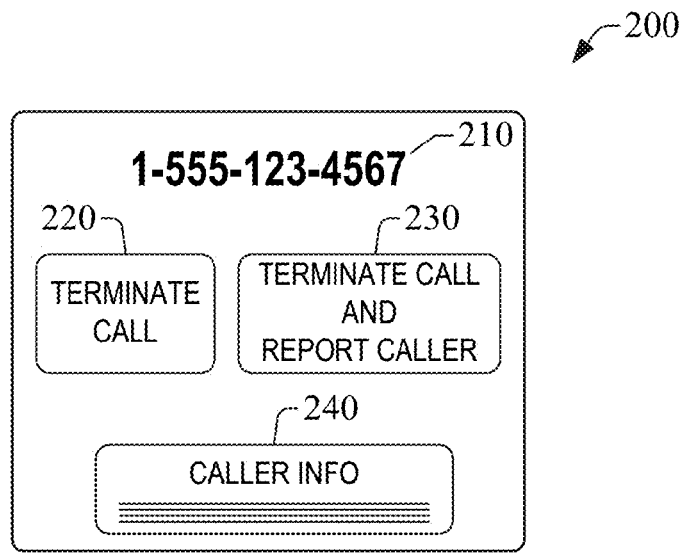
FIGS. 2A-2B illustrate examples of user interfaces for managing a call from an unknown caller in accordance with one or more embodiments of the disclosure.

In certain embodiments, the communication call between the caller communication platform 110 and the communication device 120 can be initiated and allowed to proceed. In addition, during the communication call, the communication device 120 can present a user interface (UI) including selectable or otherwise actionable indicia. Actuation of the indicia (or other type of interaction with the indicia) can cause the communication device 120 to (i) terminate the call or (ii) terminate the call and report the telephone number associated with the caller communication platform 110 as a telemarketer or other type of entity. As an illustration, FIG. 2A presents an example user interface 200 that can be displayed after or upon a call from the caller communication platform is allowed to proceed. As illustrated, the example UI 200 can present a telephone number 210 (or other type of communication address) of the caller communication platform and actionable indicia 220 and 230, where in response to respective actuation, actionable indicia 220 can cause the communication device 120 to terminate the call and actionable indicia 230 can cause the communication device 120 to terminate the call and report the caller communication platform 110. In one example, the caller communication platform 110 can be reported by transmitting a message or other type of information to the caller analysis server 140, where the message includes the telephone number of the caller and information that characterizes the caller as a telemarketer or other type of entity. To at least such an end, in certain embodiments, actuation of the indicia 230 can cause the communication device 120 to display a list of selectable options, each conveying a type of entity (e.g., telemarketer, debt collector, and the like) that can be assigned to the caller.

The example UI 200 also can include, for example, selectable or otherwise actionable indicia 240 that can display or otherwise present information that characterizes the caller. As described herein, at least a portion of such information can be received from the caller analysis server 140. It should be appreciated that while a specific arrangement, number, and relative sizes of the indicia are shown in the UI 200, the disclosure is not so limited other arrangements and relative sizes can be considered. Similarly, more or less than the number of indicia shown also can be contemplated.

Figure 2B:
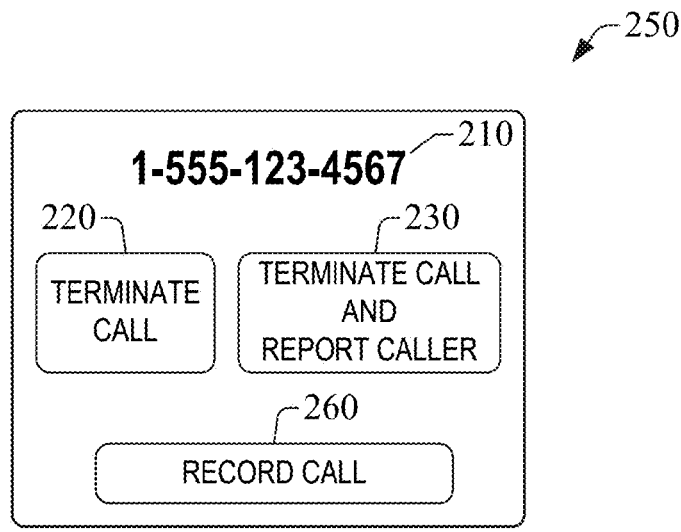

FIG. 2B presents another example user interface 250 that can permit managing a call from the caller communication platform 110. As illustrated, the example UI 250 includes selectable or otherwise actionable indicia 260 (labeled "record call 260") In certain embodiments, actuation of or other type of interaction with the indicia 260, can cause the communication device 120 to record at least a portion of the audio (received and/or transmitted) as the call progresses. The call can be recorded for the duration of the call or the recording of the call can be terminated in response to a second actuation of or other type of additional interaction with the indicia 260. Upon or after the call is recorded, the communication device 120 can process (e.g., edit and/or compress) the recorded audio. The communication device 120 can send the raw or processed recorded audio to a remote computing device (e.g., a third-party server or other type of server) or can retain within a memory device integrated into the communication device 120 or functionally coupled thereto. In other embodiments, the communication device 120 can initiate a recording of the audio of the call in response to the call being accepted. In one of such embodiments, actuation of or other type of interaction with the indicia 260 can cause the communication device 120 to send the audio that has been recorded to the point of the actuation to a remote computing device, and/or to retain such audio in a memory device integrated into the communication device 120 or functionally coupled thereto.

Figure 3:
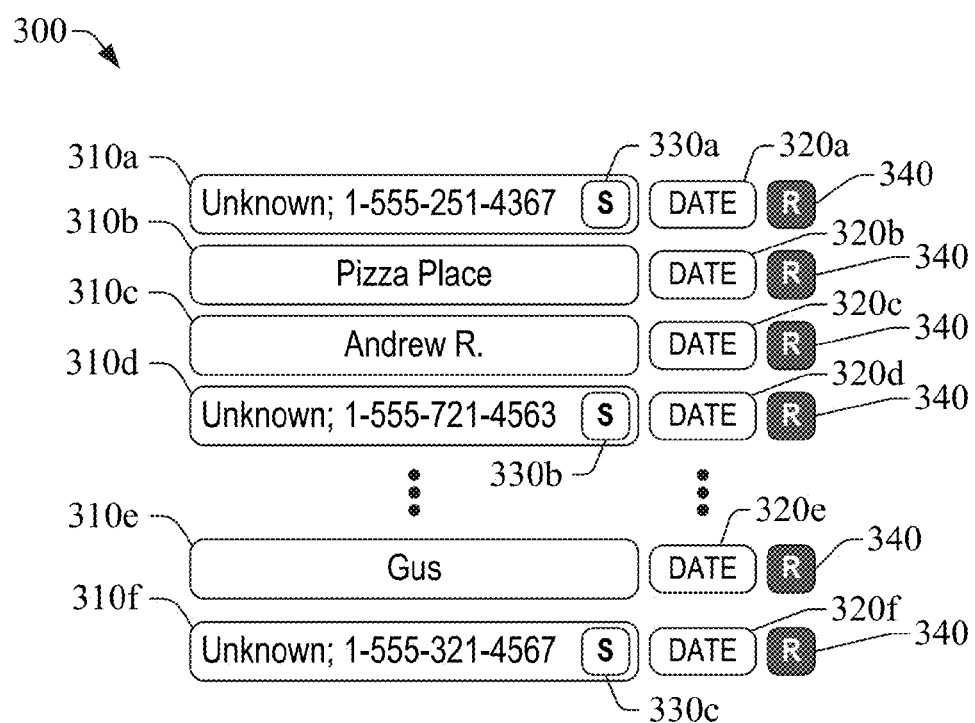
FIG. 3 illustrates another example of a user interface for managing a call from an unknown caller in accordance with one or more embodiments of the disclosure.

In addition or in other embodiments, a telephone number or other type of communication address associated with a communication call (e.g., utilized to initiate the call) can be reported as a telemarketer or other type of commercial entity after the call is terminated. To that end, for example, the communication device 120 can provide a selectable option to report a telephone number in a call history of the communication device 120. As an illustration, FIG. 3 illustrates an example user interface 300 that can present a portion of a call history of the communication device 120 and selectable options to report a telephone number in the call history as a telemarketer or other type of commercial entity. The user interface 300 includes indicia 310*a*-310*f* indicative of respective telephone numbers in the call history, and indicia 320*a*-320*f* representative of a time (generically labeled "date") of a respective call associated with a telephone number. Some of the indicia, such as indicia 310*b*, 310*c*, and 310*e*, can represent telephone numbers included in an address book or other type of contact list of the communication device 120. Accordingly, such indicia can include specific contact names instead of a telephone number. Other indicia, such as indicia 310*a*, 310*d*, and 310*f*, can represent telephone numbers associated with unknown callers and are represented accordingly. As described herein, an unknown caller can initiate a call with the communication device 120 via the caller communication platform 110. Therefore, in certain examples, the unknown caller can be associated with a telemarketer or other type of entity (commercial or otherwise).

As illustrated, the indicia representative of a telephone number from an unknown caller can include selectable or otherwise actionable indicia that, in response to actuation, can cause the communication device 120 to display or otherwise present (e.g., emit sounds) caller information. In one aspect, the caller information can characterize an entity associated with the telephone phone in accordance with aspects described herein. More specifically, indicia 310*a* can represent a first unknown caller having the telephone number "1-555-251-4367," and can include selectable or otherwise actionable indicia 330*a* (labeled "5") that, in response to actuation or other type of interaction therewith, can present caller information. Each of the selectable or otherwise actionable indicia 310*d* and 310*f* includes a similar feature, e.g., selectable or otherwise actionable indicia 330*b* and 330*c*.

In addition, for each of the indicia 310*a*-310*f*, the example UI 300 can include a selectable or otherwise actionable indicia that, in response to actuation (or other type of interaction, such as selection), can cause the communication device 120 to report the telephone number as a telemarketer or other entity (e.g., the American Red Cross, a hospital or doctor office, or the like). As such, in certain embodiments, actuation of the indicia 340 can cause the communication device 120 to display other indicia (e.g., a fillable form, such as an HTML form, or other types of fillable fields) that can prompt an end-user of the communication device 120 to input information that characterizes the caller as a telemarketer or other type of entity. At least a portion of the input information can be received via interaction with a display device or a microphone of the communication device 120. The communication device 120 can transmit at least the portion of the received information to the caller analysis server 140 via the pathway 125.

In certain embodiments, the communication device 120 can allow the call from the caller communication platform 110 to proceed and can record at least a portion of the audio input signal and/or other type of communication signal received from the caller communication platform 110. For instance, the communication device 120 can record the call for a specific period, which can be shorter than or equal to the call duration. The recorded audio input signal can be utilized to analyze the call and generate intelligence about the caller communication platform 110. In one example, the communication device 120 can generate a signature in which the recorded audio input signal can be anonymized to remove private or other type of sensitive information associated with an end-user of the communication device 120. The communication device 120 can transmit such a signature to the caller analysis server 140 for processing. In certain implementations, as part of the processing, the caller analysis server 140 can perform voice detection and/or speech recognition in order to determine if the call includes a known telemarketing message or if it is a common request from telemarketers or other type of entities (legitimate or otherwise).

In addition or in other embodiments, the communication device 120 can present a selectable or otherwise actionable option to send a recorded portion of a communication call to a remote server or other type of remote computing device—e.g., indicia 260 shown in FIG. 2B. In one example, the remote server can be embodied in or can constitute a computing platform of a law enforcement agency. In another example, the remote server can be embodied in or can include a computing platform for training of an expert system or other type of learning machine. The report can constitute information (data and/or metadata) that can permit the computing platform (e.g., the caller analysis server 140) to improve the heuristics for detecting or otherwise identifying a telemarketer or other type of commercial entity. For example, in certain scenarios, a telemarketer plays the same audio segment or pre-recording in each communication call to a communication device. As such, one or more of the called communication device can report the audio segment to the computing platform, which can infer or otherwise determine that the audio-segment pertains to a telemarketer pre-recording. In response to selection of such an option, the communication device 120 can transmit the recorded portion of the communication call to a communication device or other communication platform of a law enforcement agency. As described herein, the recorded portion of the communication call can span a period shorter than or equal to the call duration.

In certain embodiments, the communication device 120 can allow the call to proceed and can respond with an utterance, e.g., "hello," and can pause, waiting for the telemarketer's system to connect a live agent. At that point, for example, the communication device 120 can record the audio of the agent and can transmit it to the caller analysis server 140 for correlation. In certain embodiments, a telemarketer's specific voice based on previous calls may be recognized in a current call, and thus, regardless of the telephone number utilized to initiate the call with the communication device 120, the caller analysis server 140 can recognize the caller communication platform 110 as a telemarketer. Depending on how much market the phone has, this could even potentially record normal conversations and identify who that person really is (their name, personal phone number, etc.). Depending on sophistication, the communication device 120 can interact with the caller communication platform 110. In one embodiment, such interaction can include providing numbers or other codes to navigate menus in scenarios in which the caller communication platform 110 embodies or includes an IVR system or other type of automated communication platform. In addition or in other embodiments, as part of such an interaction, the communication device 120 can provide specific names, email addresses, or the like, that can be used later to correlate the identity of the caller communication platform 110 and how it uses the information provided by the communication device 120. Providing such information can permit or otherwise facilitate sharing information with law enforcement on non-legitimate or criminal caller communication platforms.

In other embodiments, the caller analysis server 140 can query a repository associated with another server and, in response, the caller analysis server 140 can access or otherwise receive information that characterizes or otherwise identifies a caller telephone number received from the communication device 120. As such, in one example, the caller analysis server 140 can send caller information that identifies the caller telephone number and the communication device 120 can display indicia representative of the caller identity. More specifically, the caller analysis server 140 can query an enterprise repository (e.g., a database of an organization) and can obtain identification (ID) information for an individual associated with the caller telephone number. The caller analysis server 140 can then send the ID information to the communication device 120, which can display it in conjunction with the caller telephone number and selectable indicia that can permit accepting the call or rejecting it. In addition or in other implementations, the communication device 120 can include a list of unacceptable callers (which can be referred to as a "black" list, "do not call" list, "block" list, or the like) that can be compared to the received ID information. The communication device 120 can reject a call in response to the ID information being included in the black list. The call can be rejected with or without the communication device 120 presenting indicia indicative of the call (e.g., the communication device 120 may not ring nor vibrate in response to the incoming call).

As described herein, in certain embodiments, the response or behavior of the communication device 120 associated with a call from the caller communication platform 110 can be determined by caller information received from the caller analysis server 140. As described herein, such information can be received, periodically or otherwise, from the caller analysis server 140. In addition or in other implementations, the information can be received in response to an event, such as in response to the communication device 120 sending a caller telephone number associated with the call. Therefore, it can be appreciated that lack of connectivity or other telecommunication issues between the communication device 120 and the caller analysis server 140 can preclude the communication device 120 from responding to the call in accordance with aspects described herein. Accordingly, in addition or in other embodiments, the communication device 120 can retain at least a portion of the received caller information and can respond to an incoming call regardless of being connected or otherwise in communication with the caller analysis server 140. For instance, the communication device 400 can receive a list of telephone numbers associated with a telemarketer and can retain the list within the caller info. 486. As such, in response to receiving a call, the communication device 400 can compare the caller telephone number of the call with the list of telephone numbers and can determine that the caller telephone number is included in the list. In response, the communication device 400 can reject or otherwise process the call regardless of the connectivity status between the communication device 400 and the caller analysis server 140. In a scenario in which a call is rejected based on the list of telephone numbers, the list can effectively embody a "no call" or black list for the communication device 400. Further or in yet other embodiments, the communication device 120 can query (periodically or otherwise) the caller analysis server 140 for caller information associated with a caller telephone number. The communication device 120 can retain or otherwise store at least a portion of the information received in response to the query. The retained or otherwise stored caller information can permit responding to a call from the caller communication platform 110 even in the presence of telecommunication issues between the communication device 120 and the caller analysis server 140.

Information indicative or otherwise representative of a response to a call received at the communication device 120 can be collected at the caller analysis server 140. The behavior of the caller communication platform 110 after the response from the communication device 120 also can be monitored. More specifically, for a response effected by the communication device, information on how the caller communication platform 110 has responded, e.g., no further calls from the caller have been received at the communication device 120, calls from the caller communication platform 110 have been received more frequently at the communication device 120, calls from the caller communication platform 110 have been received less frequently at the communication device 120, additional telemarketing calls have been received at the communication device 120.

Figure 4:
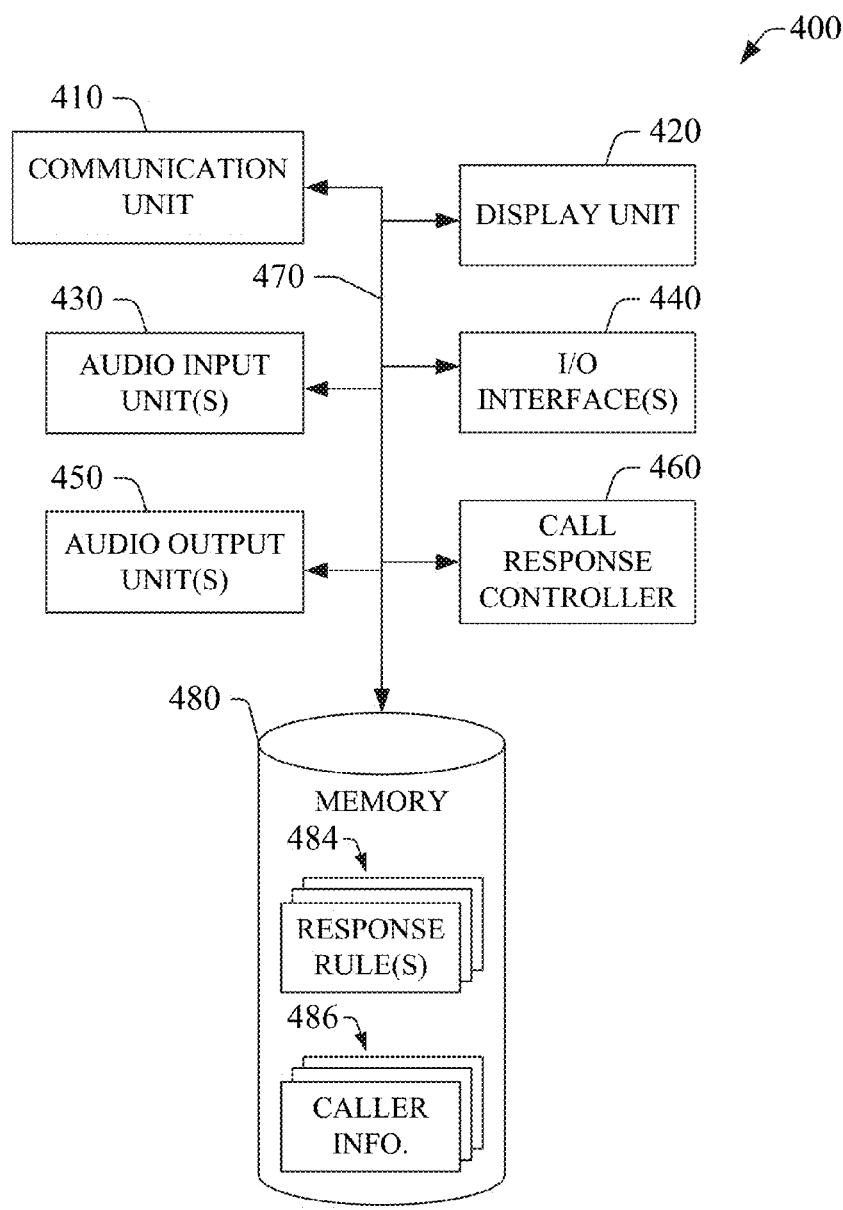
FIGS. 4-5 illustrate examples of communication devices that can manage a call from an unknown caller in accordance with one or more embodiments of the disclosure.

FIG. 4 illustrates an example embodiment of a communication device 400 that can manage responses to a communication call from an unknown caller system in accordance with one or more aspects of the disclosure. The communication device 400 can embody the communication device 120. As illustrated, the communication device 400 can include a communication unit 410 that can permit communication with a caller communication platform (such as an auto-dialer) or other type of communication devices or systems. More specifically, in one example, the communication unit 410 can permit establishing a call in response to a request to connect from the caller communication platform. In addition, the communication unit 410 can permit the call to proceed and also can terminate the call as appropriate. The communication unit 410 also can access or otherwise obtain a telephone number (or other type of communication address) of the caller communication platform. As described herein, the telephone number can be submitted to a remote computing device (such as the caller analysis server 140). To that end, in one example, the communication unit 410 can generate a message or other type of information including the telephone number, and can transmit the message or information to the caller analysis server 140. As described herein, the caller analysis server 140 can generate or otherwise access caller information that characterizes the caller communication platform that transmitted the request to connect with the communication device 400. In certain embodiments, the communication unit 410 can receive at least a portion of the caller information. The caller information (labeled as "caller info." in FIG. 1) that is received at the communication device 400, via the communication unit 410, for example, can be retained for at least a certain period in one or more memory devices 480 (referred to as memory 480). The communication unit 410 can permit wireless and/or wireline communication.

As illustrated, the communication device 400 can include one or more audio input units 430 and one or more audio output units 450. At least one of the audio input unit(s) 430 can include a microphone that can receive sound, such as an utterance, from an end-user of the communication device 400. At least one of the audio output unit(s) 450 can present the end-user with one or more options related to responding to a call from a caller communication platform. More specifically, in one example, the at least one of the audio output unit(s) 450 can present audio to the end-user prompting the end-user to record, at least temporarily, the call. To at least such an end, in one example, the audio output unit(s) 450 can include at least one piezoelectric speaker that can transmit audio to an end-user of the communication device 400.

In addition, the communication device 400 can include a display unit 420 that can present or otherwise display various interfaces for management of a response to a call from a caller in accordance with aspects described herein. For instance, the display unit 420 can present the example user interfaces 200, 250, and 300 shown in FIG. 2A, FIG. 2B, and FIG. 3, respectively.

The communication device 400 also can include a call response controller 460 that can manage a response to a call received from a caller communication platform. In certain implementations, the call response controller 460 can access caller information from the memory 480, for example. Based on at least a portion of such information, the call response controller 460 can cause the communication unit 410 to reject a request to connect (or to terminate initiation of a call) received from the caller communication platform. To that end, the call response controller 460 can apply one or more response rules to the caller information, and the outcome of the applied rule(s) can determine that the request is to be rejected. In addition or in other implementations, for other caller information, the outcome of the application of response rule(s) can determine or otherwise indicate that the request to connect is to be accepted, and that the call is to be permitted to proceed. Therefore, in one example, the call response controller 460 can cause the communication unit 410 to establish the call and can cause the display unit 420 to present a user interface including actionable options to accept or decline the call. In response to the call being accepted, the display unit 420 can present other user interface(s), such as example UI 200, that can permit responding to the call. The response rules that can be leveraged or otherwise utilized by the call response controller 460 can be retained in one or more memory elements 484 (referred to as "response rule(s) 484").

As described herein, the user interface displayed by the display unit 420 can present selectable or otherwise actionable indicia representative of options to manage a call that is accepted or in progress. The call response controller 460 can receive input information in response to selection of at least one such option, and can cause (e.g., can direct or can instruct) the communication unit to operate in accordance with aspects described herein.

In certain embodiments, the display unit 420 can include an input interface—such as a capacitive touchscreen or a resistive touchscreen combined with an input interface module—that can permit receiving input information indicative of the selection. The input interface module can be included in the one or more input/output (I/O) interface(s) 440. In addition, the I/O interface(s) 440 can include at least one port (serial, parallel, or both), at least one Ethernet port, at least one pin, and can permit communication of information between the communication device 400 and an external electronic device, such as another computing device (e.g., a remote network device or an end-user device).

As described herein, in certain implementations, the communication device 400 can retain or otherwise store caller information in one or more memory elements 486 (referred to as "caller info. 486") of the memory 480. In one example, the caller information can include a list of telephone numbers or other types of communication addresses. The caller information may be received in response to the communication device 400 receiving a call and sending a telephone number associated with the call to a caller analysis server, such as server 140. In addition or in other implementations, the communication device 400 can receive the caller information (e.g., a list of telephone numbers) from the caller analysis server. For instance, the caller analysis server (e.g., server 140) can push or otherwise transmit a list of telephone numbers or other type of caller information to the communication device 400. Caller information can be pushed or otherwise transmitted to the communication device 400 at specific times (e.g., periodically or according to other schedule) and/or in response to an event. Further or in yet other implementations, the communication device 400 can query the caller analysis server for caller information associated with a caller telephone number. In response to the query, the communication device 400 can receive caller information, and can retain or otherwise store at least a portion of the information. The communication device 400 can retain the information available in the caller info. 486 for a predetermined period and/or until the communication device 400 receives information to remove the information from the memory 480. The caller info. 480 can permit the communication device 400 to respond to a caller from an unknown caller platform without reliance on exchange of information with the caller analysis server (e.g., the caller analysis server 140).

As illustrated, the communication device 400 includes a bus architecture 470. Two or more of the functional elements of the communication device 400 can exchange information (e.g., data, metadata, code instructions, signaling and related payload data, combinations thereof, or the like) through the bus architecture 470, which can embody or can comprise at least one of a system bus, an address bus, a data bus, a message bus, a reference link or interface, a combination thereof, or the like. The bus architecture 470 can include, for example, components for wireline and wireless communication.

Figure 5:
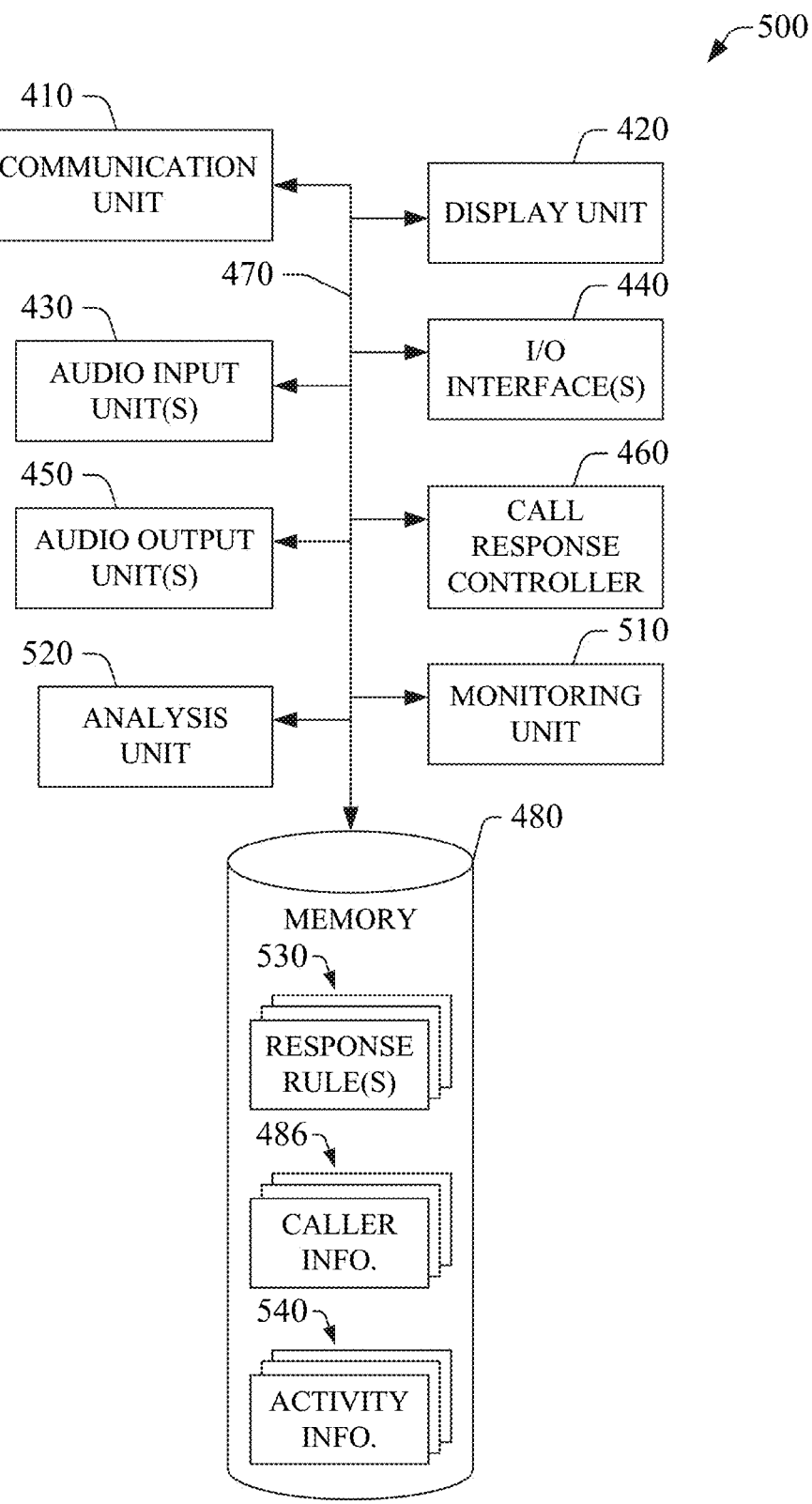

FIG. 5 illustrates an example embodiment of a communication device 500 that can manage responses to a communication call from an unknown caller system in accordance with one or more aspects of the disclosure. The communication device 500 can embody the communication device 120. As illustrated, the communication device 500 can include several of the functional elements of the communication device 400, where each of such elements (e.g., the communication unit 410, the display unit 420, the audio input unit(s) 430, the I/O interface(s) 440, the audio output unit(s) 450, and the call response controller 460) can operate as described herein with reference to FIG. 4. In addition, the communication device 500 can include a monitoring unit 510 that can collect device activity information indicative of certain operational activities of the communication device 500. More specifically, in one example, the monitoring unit 510 can collect information indicative or otherwise representative of web-browsing histories, call history, activity logs, user profiles, combinations thereof, or the like. As described herein, an activity log can include information indicative or otherwise representative of applications or other type of software executed or otherwise utilized at the communication device 500; information indicative of financial transactions made at or via the communication device 500; a combination thereof; or the like. As such, the information collected or otherwise monitored by the monitoring unit 510 can include information generated in response to communication calls received and/or generated at the device, and/or information generated by one or more device functionality unit(s) (not depicted in FIG. 5) that can provide specific functionality to the communication device 500.

The monitoring device 510 can retain at least a portion of the device activity information in one or more memory elements 540 (referred to as "activity info. 540"). In certain implementations, the communication device 500 can utilize or otherwise rely on at least a portion of the activity info. 540 in order to determine a response to a communication call received at the communication device. To that end, in one example, the call response controller 460 can access a portion of the activity info. 540 and can apply one or more response rule(s) to the accessed information. The outcome of the application of the applied response rule(s) can determine the response or specific action implemented by the communication device 500 following a call from an unknown caller system (e.g., the caller communication platform 110). As such, in one aspect, the communication device 500 can respond to the call according to historical information of the communication device 500 and, thus, the response can be germane to the communication device 500. As illustrated, such response rule(s) can be retained in one or more memory elements 530.

In addition, the communication device 500 can include an analysis unit 520 that can process at least a portion of the caller info. 486 and can characterize a source of a call received at the communication device 500. The analysis unit 520 can analyze the caller info. 486 in a manner similar to that in which the caller analysis server 140 analyzes the caller info. 154. Therefore, it can be appreciated that the analysis unit 520 can permit the communication unit 500 to characterize a caller without reliance on the exchange of information with a remote computing device. As an illustration, as described herein, the caller info. 486 can include a list of telephone numbers associated with respective telemarketers, and as such, the communication unit 500 can identify the source of the call as being a telemarketer by comparing a caller telephone number to such a list. Therefore, the communication device 500 can reject or respond in a specific fashion to the call. In addition or as another illustration, the caller information 486 can include an audio signature associated with a telemarketer or another type of calling entity, and thus, the communication device 500 can identify the source of the call as being a telemarketer by comparing incoming audio signal of the call to the audio signature. To that end, in one example, the analysis unit 520 can analyze at least a portion of the incoming audio input signal in order to generate an incoming audio signature. To that end, in one example, the analysis unit 520 can recognize one or more keywords (e.g., words or phrases) in the incoming audio input signal by implementing approaches or techniques for keyword spotting and/or full-fledged speech recognition. As such, in one aspect, the analysis unit 520 can apply a keyword model to the incoming audio input signal, where the keyword model (e.g., a hidden Markov model (HMM) and/or a Gaussian mixture model) is directed to representing one or more predetermined keywords, and predicting or otherwise providing a likelihood that observed audio input includes or otherwise conveys the one or more predetermined keywords. The keyword model can be retained in the memory 480 (e.g., within the response rule(s) 530). In another example, the analysis unit 520 can perform spectral analysis of at least a portion of the incoming audio input signal and can identify or otherwise determine certain audio frequencies present in the incoming audio input signal. The analysis unit 520 can compare the incoming audio signature with the audio signature included in the caller info. 486. The communication device 500 can reject or otherwise respond to the call of the so identified source without human intervention. In addition or in the alternative, the comparison of an incoming audio signature with audio signature(s) available in the caller info. 486 can permit the communication device 500 to determine or otherwise identify the call as being associated with a fraudulent business activity or a legitimate business activity. Accordingly, in one aspect, the communication device 500 can reject, accept, or otherwise respond to the call—e.g., transmit at least a portion of the incoming audio input signal of the call to a remote device for analysis—based on the identified type (legitimate or fraudulent, for example) of the business activity. Therefore, it can be appreciated that in response to a call received at the communication device 500, the call response controller 460 can apply one or more rules of the response rule(s) 530 to caller information generated via the analysis unit 520. The outcome of the applied rule(s) can determine the response or other type of action performed by the communication device 500 following a call from an unknown caller system.

It should be appreciated that, in certain implementations, the call response controller 460 can apply one or more rules to a portion of the caller information generated by the analysis unit 520 and a portion of the activity info. 540.

Figure 6:
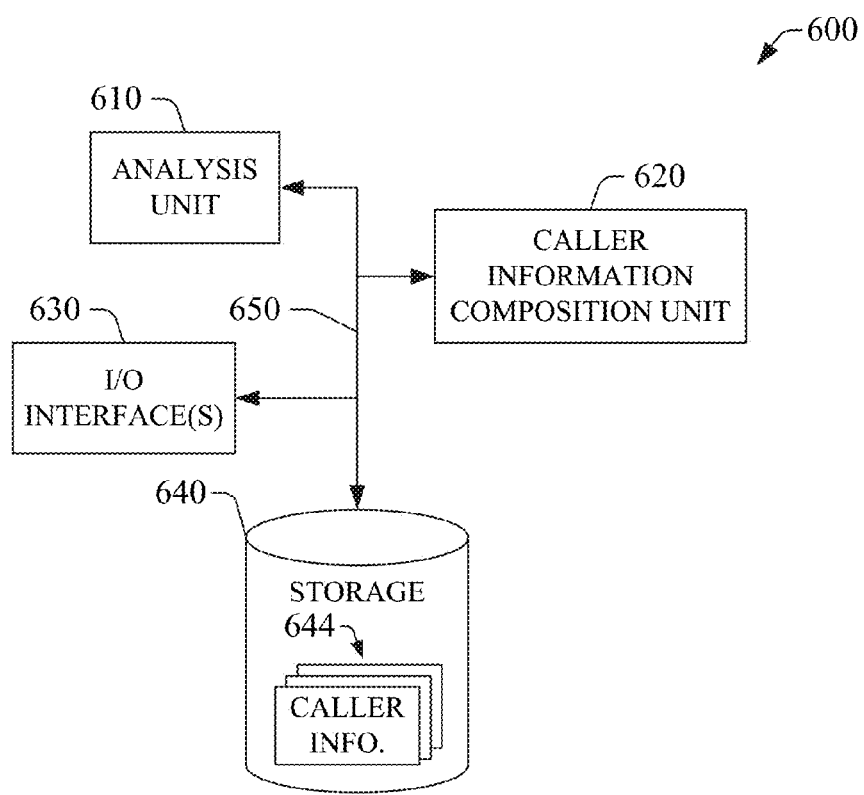
FIG. 6 illustrates an example of a computing device that can generate caller information for management of a call from an unknown caller in accordance with one or more embodiments of the disclosure.

FIG. 6 illustrates an example of an embodiment of a caller analysis server 600 in accordance with one or more embodiments of the disclosure. In certain scenarios, the caller analysis server 600 can embody or can include the caller analysis server 140 discussed with reference to the example operational environment 100 in FIG. 1. The caller analysis server 600 can include an analysis unit 610 that can receive or otherwise access report information associated with one or more telephone numbers or other type of communication addresses. As described herein, at least a portion of the report information can identify a telephone number of the one or more telephone numbers as pertaining or being associated with a telemarketer or other type of commercial entity, and/or a government entity (such as a public library, a local enforcement agency, or the like). In addition or in other implementations, at least a portion of the report information can include call recordings, wherein one of the call recordings can be provided by a communication device that accepted a call from a caller communication platform (e.g., a telemarketer, a debt collector, a government representative, or the like). In certain implementations, the analysis unit 610 can select a telephone number or other type of communication address included in the report information, and can query one or more repositories in order to obtain content (e.g., media or other type of data, metadata, or the like) associated with the telephone number of other type of communication address. More specifically, in certain embodiments, the analysis unit 610 can include or can implement a search engine that can utilize the telephone number or other type of communication address to query one or more databases in order to obtain content that includes or is otherwise associated with the telephone number or other type of communication address. In addition or in other embodiments, the analysis unit 610 can include or can implement a web crawler or other type of information collection engine in order to index information for performing a search or other type of analyses. The analysis unit 610 can retain any indexed information or information obtained in a search in one or more memory devices 640.

Further or in yet other implementations, the analysis unit 610 can analyze or otherwise process call recordings or other audio segments in order to generate an audio signature or other type of model for a caller communication platform. To that end, in certain implementations, the analysis unit 610 can include a machine-learning unit that implement statistical analysis to some or all of the recordings and/or other audio segments to generate the audio signature. The statistical analysis can rely or otherwise leverage techniques for supervised and/or non-supervised machine-learning.

In certain embodiments, in order to access caller information via a query, for example, the analysis unit 610 can utilize or otherwise leverage at least one of the I/O interface(s) 630. The I/O interface(s) 630 can include at least one port (serial, parallel, or both), at least one Ethernet port, at least one pin, and can permit the exchange of information (e.g., data, metadata, and/or signaling) between the caller analysis server 600 and a resource (such as a computing device) directly or indirectly functionally coupled to the caller analysis server 600. The at least one of the I/O interface(s) 630 can receive information associated with the telephone number or other type of communication address associated with a caller communication platform. The analysis unit 610 can process at least a portion of the received information and can generate, as described herein, feature information that can characterize the type of caller communication platform (e.g., a telemarketer, a banking institution or a representative thereof, a debt collector, a dentist office, or the like); a volume and/or type of calls originated from the caller communication platform; calling behavior, such as typical time of day and/or typical time of week that the caller communication platform initiates a call; relationships between telephone numbers associated with the caller; a combination thereof; or the like.

At least a portion of the information that can be received and/or generated at the caller analysis server 600 can be provided to a caller information composition unit 620 that can configure data and/or metadata indicative or otherwise representative of a caller. Therefore, in certain implementations, the caller information composition unit 620 can generate caller information corresponding to a caller communication platform related to a telephone number of other type of communication address. Specifically, in one example, the caller information can convey that a certain telephone number (e.g., 1-555-123-4567) corresponds to a mortgage lender, with low volume of calls that are placed in the evening during weekdays, and that typically no voicemails are provided in calls are unanswered. Such caller information can be arranged in an XML file or other type of information structure that can be leveraged or otherwise utilized by a communication device in order to respond to a call from such a telephone number. As described herein, the caller information so generated can be retained in one or more memory elements 644 in one or more memory devices 640 (referred to as storage 640). It can be appreciated that the storage 640 and the caller info. 644 can embody or can constitute, respectively, the storage 150 and the caller info. 154.

In certain implementations, the caller info. 644 can be indexed or otherwise catalogued according to the telephone number or other type of communication address of a caller communication platform. Therefore, in one aspect, the caller analysis server 600 can receive a telephone number or other type of communication address, and can determine if corresponding caller information is available. As described herein, in response to the corresponding caller information being available, the caller analysis server 600 can send at least a portion of the caller information to the communication device that provided the telephone number or other type of communication address.

As illustrated, the caller analysis server 600 includes a bus architecture 650. Two or more of the functional elements of the caller analysis server 600 can exchange information (e.g., data, metadata, code instructions, signaling and related payload data, combinations thereof, or the like) through the bus architecture 650, which can embody or can comprise at least one of a system bus, an address bus, a data bus, a message bus, a reference link or interface, a combination thereof, or the like. The bus architecture 650 can include, for example, components for wireline and wireless communication.

Figure 7:
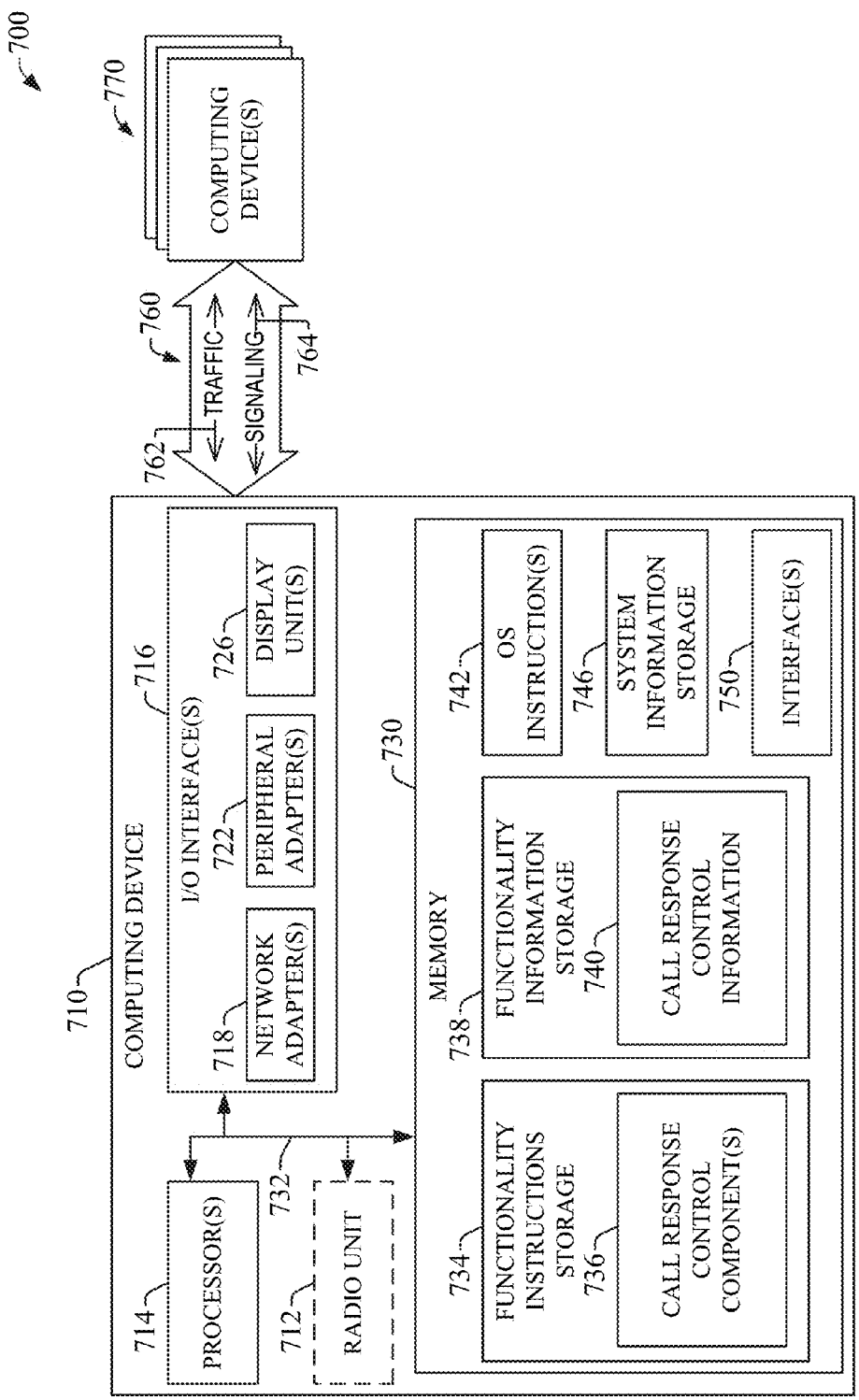
FIG. 7 illustrates an example of a computing device that can manage a call from an unknown caller in accordance with one or more embodiments of the disclosure.

FIG. 7 illustrates a block diagram of an example computational environment 700 for management of a call from unknown caller systems in accordance with one or more aspects of the disclosure. The example computational environment 700 is merely illustrative and is not intended to suggest or otherwise convey any limitation as to the scope of use or functionality of the computational environment's architecture. In addition, the illustrative computational environment 700 depicted in FIG. 7 should not be interpreted as having any dependency or requirement relating to any one or combination of components illustrated in the example operational environments of the disclosure. The example computational environment 700 or portions thereof can embody or can constitute the operational environments described hereinbefore. As such, the computing device 710 can embody or can constitute, for example, any of the communication devices or servers (such as the caller analysis server 140) described herein. In one example, the computing device 710 can be embodied in a portable personal computer or a handheld computing device, such as a mobile tablet computer, an electronic-book reader, a mobile telephone (e.g., a smartphone), and the like. In another example, the computing device 710 can be embodied in a wearable computing device, such as a watch, goggles or head-mounted visors, or the like. In yet another example, the computing device 710 can be embodied in portable consumer electronics equipment, such as a camera, a portable television set, a gaming console, a navigation device, a voice-over-internet-protocol telephone, a media playback device, or the like.

The computational environment 700 represents an example implementation of the various aspects or features of the disclosure in which the processing or execution of operations described in connection with the management of unknown callers in accordance with aspects disclosed herein can be performed in response to execution of one or more software components at the computing device 710. It should be appreciated that the one or more software components can render the computing device 710, or any other computing device that contains such components, a particular machine for the management of unknown callers in accordance with aspects described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIG. 7. For instance, to embody one such method, at least the portion of the computer-accessible instructions can be retained (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the management of unknown callers in accordance with aspects described herein can comprise personal computers; server computers; laptop devices; handheld computing devices, such as mobile tablets or e-readers; wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit the exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which the processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as the exchange of information between the computing device 710 and the external device via a network or elements thereof. As illustrated, the I/O interface(s) 716 can comprise one or more of network adapter(s) 718, peripheral adapter(s) 722, and display unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or more computing devices 770 via one or more traffic and signaling pipes 760 that can permit or facilitate the exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the display unit(s) 726 can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the call response control component(s) 736 or the call response control information 740, or both, can be distributed between the computing device 710 and at least one of the computing device(s) 770, and the computing device 710 and at least one of the computing device(s) 770 can execute such components and/or leverage such information. It should be appreciated that, in an embodiment in which the computing device 710 embodies or constitutes a communication device (e.g., communication device 120), the call response control component(s) 736 can be different from those in an embodiment in which the computing device 710 embodies or constitutes a caller analysis server (e.g., server 140) in accordance with aspects of this disclosure. Specifically, as an example, in an embodiment in which the computing device 710 embodies the call analysis server 140, the call response control component(s) and/or the call response control information 740 can configure the computing device 710, or at least one of the processor(s) to provide the functionality of the call analysis server 140 according to aspects described herein.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as call response control component(s) 736. In one scenario, execution of at least one component of the call response control component(s) 736 can implement one or more of the methods described herein, such as the example methods 700 and 800. For instance, such execution can cause a processor (e.g., one of the processor(s) 714) that executes the at least one component to carry out a disclosed example method. It should be appreciated that, in one aspect, a processor of the processor(s) 714 that executes at least one of the call response control component(s) 736 can retrieve information from or retain information in one or more memory elements 740 in the functionality information storage 738 in order to operate in accordance with the functionality programmed or otherwise configured by the call response control component(s) 736. The one or more memory elements 740 may be referred to as call response control information 740. Such information can include at least one of code instructions, information structures, or the like. For instance, at least a portion of such information structures can be indicative or otherwise representative of communication addresses, caller information, response rules, and the like, in accordance with aspects described herein.

In certain embodiments, one or more of the call response control component(s) 736 can embody or can constitute the call response controller 460 and/or at least a portion of the communication unit 410, and can provide the functionality of such unit(s) in accordance with aspects of this disclosure. In other embodiments, one or more of the call response control component(s) 736 in combination with at least one of the processor(s) 714 can embody or can constitute one or more of the call response controller 460 or at least a portion of the communication unit 410, and can provide the functionality of such unit(s) in accordance with aspects of this disclosure. In scenarios in which the computing device 710 can embody a caller analysis server (e.g., caller analysis server 140) and one or more of the call response control component(s) 736 provide the functionality of the caller analysis server in accordance with aspects of this disclosure.

At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of the call response control component(s) 736 or the call response control information 740 can program or otherwise configure one or more of the processors 714 to operate at least in accordance with the functionality described herein. One or more of the processor(s) 714 can execute at least one of the call response control component(s) 736 and leverage at least a portion of the information in the functionality information storage 738 in order to provide management of calls from unknown callers in accordance with one or more aspects described herein.

It should be appreciated that, in certain scenarios, the functionality instructions storage 734 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with the disclosed methods.

In addition, the memory 730 can comprise computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can comprise a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also comprises a system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the call response control component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wired link(s) and/or wireless link(s) and several network elements (such as routers or switches, concentrators, servers, and the like) that form a LAN, a MAN, a WAN, and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device and at least one remote computing device.

Figure 8:
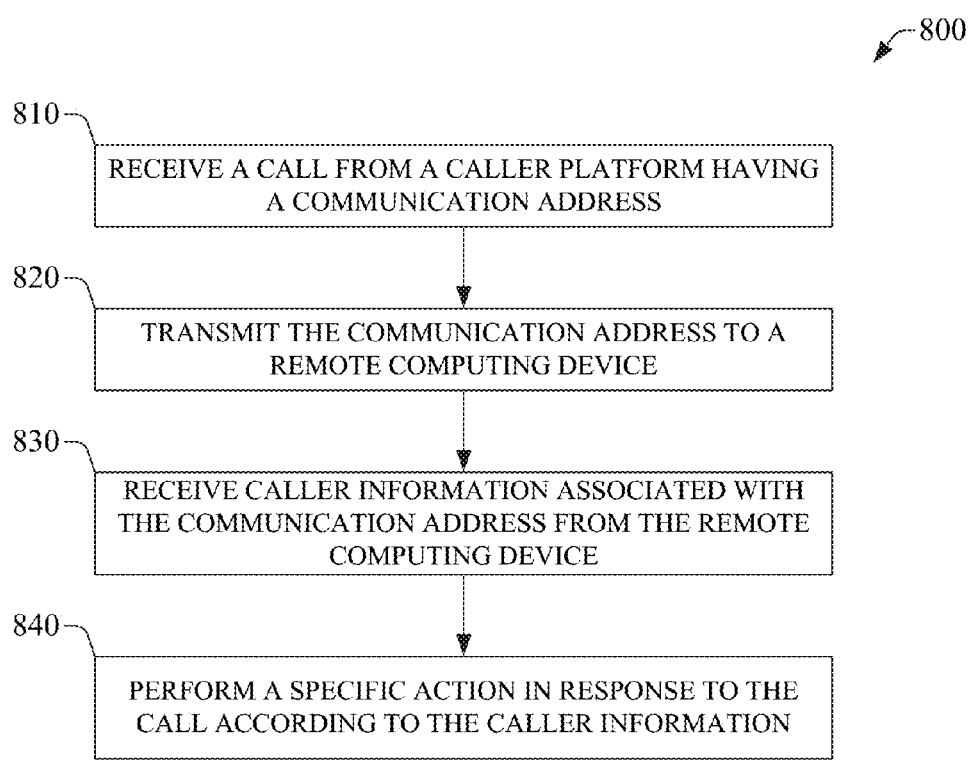
FIGS. 8-9 illustrate examples of methods for responding to a call from an unknown caller in accordance with one or more embodiments of the disclosure.
Figure 9:
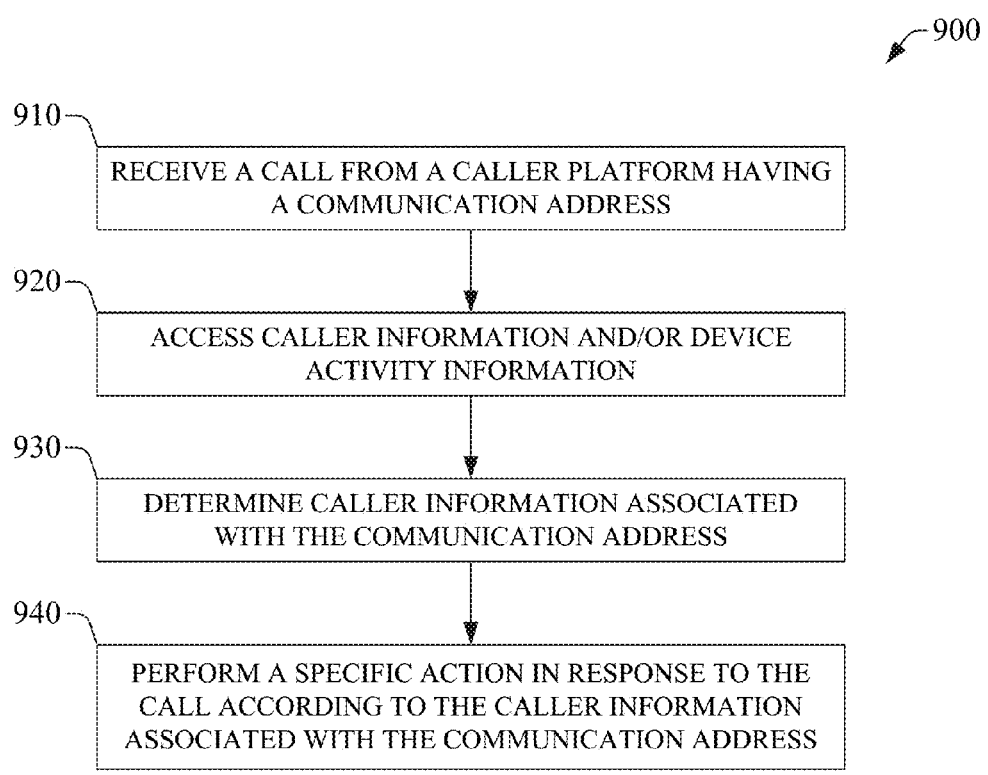
Figure 10:
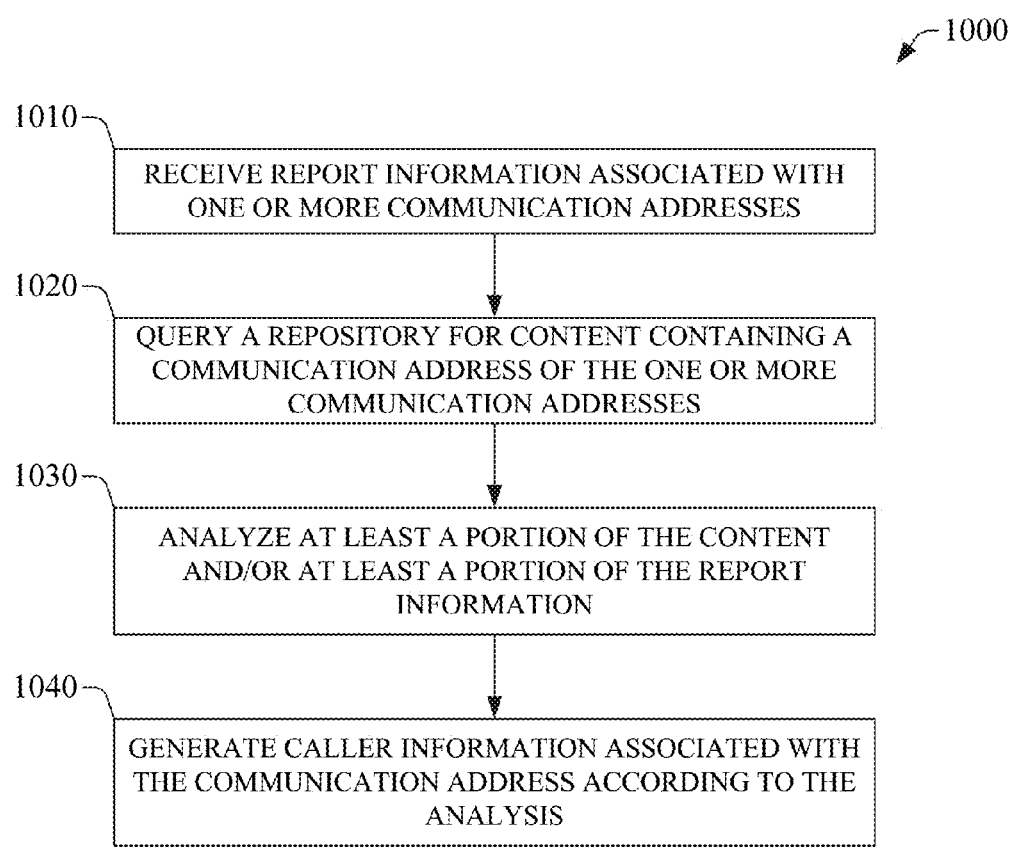
FIG. 10 illustrated an example of a method for producing caller information for management of a call from an unknown caller in accordance with one or more embodiments of the disclosure.

In view of the aspects described herein, example methods that can be implemented in accordance with the disclosure can be better appreciated with reference, for example, to the flowcharts in FIGS. 8-10. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods in accordance with this disclosure can be retained on an article of manufacture, or computer-readable medium, to permit or facilitate transporting and transferring such methods to a computing device (such as a two-way communication device, such as a mobile smartphone or a voice-over-IP tethered telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement one or more of the disclosed methods. The code instructions can provide a computer-executable or machine-executable framework to implement the methods described herein.

FIG. 8 presents a flowchart of an example method 800 for managing a call from an unknown caller according to at least certain aspects of the disclosure. In certain embodiments, a communication device (e.g., a mobile smartphone, a voice-over-IP tethered telephone, etc.) having one or more processors or being functionally coupled to at least one processor can implement (e.g., compile, execute, compile and execute, or the like) one or more blocks of the example method 800. The one or more processors of the at least one processor can be functionally coupled to one or more memory devices having encoded thereon computer-accessible instructions that, when executed, can permit implementation of one or more blocks of the subject example method. In one scenario, for example, the example communication device 400 can implement the subject example method.

At block 810, a call can be received at the communication device from a caller platform having a communication address. Receiving the call can include receiving a request to initiate a connection or call session between the communication device and the caller platform. As such, the connection or call session is associated with the communication address. The request to initiate the connection or call session can be associated with numerous types of call sessions (either voice calls or data calls) that may be established or otherwise performed, at least in part, via the communication device. The types of call sessions can include, for example, calls implemented using a cellular radio telecommunication protocol (such as voice calls over cellular telecommunication networks); calls implemented using VoIP protocols; and videotelephony calls implemented using suitable protocols for call initiation and media stream communication (e.g., transmission and/or reception). As described herein, the communication address of the caller platform can be embodied in or can include a telephone number, a subscriber number, an IMSI, an ESN, an IP address, a SIP address, a MAC address, or the like. The communication address can be included in the request to initiate the call session. It should be appreciated that while the subject example method is illustrated with reference to a communication platform, the disclosure is not limited in that respect and any type of caller device having a communication address can be contemplated in the subject example method.

At block 820, the communication device can transmit or otherwise communicate the communication address to a remote computing device (e.g., the caller analysis server 140, as described herein). At block 830, the communication device can receive caller information associated with the communication address from the remote computing device. As described herein, the caller information can characterize the caller platform, identifying various aspects of the identity and/or operation of the caller platform.

At block 840, the communication device can perform a specific action in response to the call according to at least a portion of the caller information. In one implementation, performing the specific action can include accepting the call or a request to initiate a call from the unknown caller system, and receiving audio input signal from the unknown caller system. Accepting the request can include, for example, generating challenge-response information; sending, to the unknown caller system, an audio output signal indicative of a challenge in the challenge-response information; receiving, from the unknown caller system, audio input signal indicative of a response to the challenge; and validating the response at the communication device.

In addition or in other implementations, as part of block 840, the communication device can display a first selectable indicia representative of an option to terminate the call and to send a report to the remote computing device that the unknown caller system is associated with a specific entity. Further or in yet other implementations, the communication device can display a second selectable indicia representative of an option to record at least a portion of the audio input signal.

In addition or in other implementations, performing the specific action at block 840 can include receiving, by the communication device, a selection of the second selectable indicia, and recording at least the portion of the audio input signal. In addition or in yet other implementations, performing the specific action can include determining from at least the portion of the audio input signal that the connection is related to an acceptable business activity, and sending at least the portion of the audio input signal to the remote computing device. In one aspect, the acceptable business activity can include one of a qualified business activity or a business activity having a likelihood of being acceptable that exceeds a threshold. In other implementation, performing the specific action can include determining from at least the portion of the audio input signal that the connection is related to a scam, and sending at least the portion of the audio input signal to a second remote computing device. Further or in yet other implementations, performing the specific action can include generating, from the audio input signal, an audio segment that lacks identifying information of an end-user of the communication device, and sending the audio segment to the remote computing device.

Performing the specific action at block 840 also can include, for example, terminating a call between the unknown caller system and the communication device, and displaying actionable indicia comprising one or more fillable fields to input information representative of the connection. In addition or as another example, performing the specific action at block 840 can include displaying selectable indicia representative of an option to report a communication address in a historical record of calls of the communication device.

FIG. 9 presents a flowchart of an example method 900 for managing a call from an unknown caller according to at least certain aspects of the disclosure. In certain embodiments, a communication device (e.g., a mobile smartphone, a voice-over-IP tethered telephone, etc.) having one or more processors or being functionally coupled to at least one processor can implement (e.g., compile, execute, compile and execute, or the like) one or more blocks of the example method 900. The one or more processors of the at least one processor can be functionally coupled to one or more memory devices having encoded thereon computer-accessible instructions that, when executed, can permit implementation of one or more blocks of the subject example method. In one scenario, for example, the example communication device 500 can implement the subject example method.

At block 910, a call can be received at the communication device from a caller platform having a communication address. Receiving the call can include receiving a request to initiate a call session between the communication device and the caller platform. The request to initiate the call session or otherwise connect can be associated with numerous types of call sessions (either voice calls or data calls) that may be established or otherwise performed, at least in part, via the communication device. The types of call sessions can include, for example, calls implemented using a cellular radio telecommunication protocol (such as voice calls over cellular telecommunication networks); calls implemented using VoIP protocols; and videotelephony calls implemented using suitable protocols for call initiation and media stream communication (e.g., transmission and/or reception). As described herein, the communication address of the caller platform can be embodied in or can include a telephone number, a subscriber number, an IMSI, an ESN, an IP address, a SIP address, a MAC address, or the like. The communication address can be included in the request to initiate the call session. It should be appreciated that while the subject example method is illustrated with reference to a communication platform, the disclosure is not limited in that respect and any type of caller device having a communication address can be contemplated in the subject example method.

At block 920, the communication device can access caller information and/or device activity information. As described herein, the communication device can access at least a portion of the caller information and/or at least a portion of the device activity information from one or more memory devices integrated into the communication device or functionally coupled thereto. As described herein in connection with caller info. 154, for example, the caller information can include information that can characterize multiple communication addresses (e.g., telephone numbers, IP address, URLs or other types of URI, or the like). At block 930, the communication device can determine caller information associated with the communication address. To that end, in certain embodiments, the communication device can analyze the accessed caller information and/or the accessed device activity. More specifically, in one example, the communication device can select or otherwise determine a portion of the caller information that includes the communication address, and can aggregate the portion of the caller information in order to determine, for example, volume of calls and/or frequency of calls associated with the communication address. In addition or as another example, the communication device can determine if the calls initiated by the caller platform are automated or non-automated. The communication device can carry out other types of analysis in order to generate or otherwise determine the caller information associated with the communication address. As described herein, the caller information associated with the communication address can characterize the caller platform, identifying various aspects of the identity and/or operation of the caller platform. At block 940, the communication device can perform a specific action in response to the call according to at least a portion of the caller information associated with the communication address. The communication device can implement block 940 in substantially the same manner in which block 840 is implemented.

FIG. 10 presents a flowchart of an example method 1000 for producing caller information associated with a telephone number or other types of communication addresses in accordance with one or more aspects of the disclosure. A computing device (such as a caller analysis server in accordance with this disclosure) can implement the subject example method in its entirety or in part. At block 1010, the computing device (e.g., the caller analysis server 140) can receive or otherwise access report information associated with one or more communication addresses including a telephone number, a subscriber number, an IMSI, an ESN, an IP address, a URL or other type of URI, a SIP address, a MAC address, or the like. As described herein, a communication address of the one or more communication addresses can be associated with a caller communication platform that can initiate or can attempt to initiate a communication call (e.g., a voice call or a data call) with a communication device (e.g., communication device 120).

At block 1020, the computing device can query a repository for content containing or otherwise being associated with a communication address of the one or more communication addresses. The repository can be embodied in or can include any centralized or distributed platform (e.g., shared memory devices in a server cluster or other types of storage devices) that can retain information (e.g., data and/or metadata). In one example, the repository can be embodied in or can include a distributed database (relational or unstructured). In another example, the repository can be embodied in or can include storage devices forming a network, such as the Internet or other WAN; a LAN; a MAN, a HAN, and/or a PAN. As such, files, documents, databases, hyperlinks, combinations thereof, or the like, can be queried for content containing the communication address.

At block 1030, the computing device that implements the subject example method can analyze one or more of (i) at least a portion of the content accessed or otherwise received in response to the query at block 1020, or (ii) at least a portion of the report information. At block 1040, the computing device can generate caller information (e.g., at least a portion of the caller info. 154) in accordance with aspects described herein in connection with the caller analysis server 140 and the caller info. 154.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide responses from a communication device to a call from an unknown source, such as telemarketers. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
receiving, at a mobile telephone, a call from a telemarketer call system having a telephone number;
communicating the telephone number to a remote server;
receiving, at the mobile telephone, from the remote server during the call, caller information associated with the telephone number, the caller information is used by the mobile telephone to select a type of answer to the call;
prior to accepting the call, generating challenge-response information to discriminate a human caller from an automated caller, the challenge-response information including a question having a unique solution representing an expected response to the question;
transmitting, to the telemarketer call system, an audio output signal indicative of the question;
receiving, from the telemarketer call system, audio input signal indicative of a response to the challenge;
validating the response at the mobile telephone using the expected response to the question;
accepting the call at the mobile telephone;
receiving, at the mobile telephone, audio input signal of the call;
displaying a menu of selectable options at a display device of the mobile telephone during the call, the menu of selectable options comprising (a) a first selectable option to terminate the call and to transmit a report to the remote server that the telemarketer call system is a specific telemarketer, and (b) a second selectable option to record the call;

receiving a selection via a touch screen display device of the mobile telephone;

determining that the selection is the first selectable option;

terminating the call; and transmitting the report to the remote server.

2. The method of claim 1, further comprising:

determining from the audio input signal of the call that the call is related to an approved activity associated with the telemarketer call system; and transmitting at least a portion of the audio input signal to the remote server for analysis, the approved activity being one of a qualified business activity or a business activity having a likelihood of being acceptable that exceeds a threshold.

3. The method of claim 1, further comprising:

determining that a group of predetermined keywords is present in the audio input signal of the call;

determining from the group of predetermined keywords that the call is related to a fraudulent business activity associated with the telemarketer call system; and transmitting at least the portion of the audio input signal to a second remote server.

4. The method of claim 1, further comprising:

prior to receiving the audio input signal of the call, generating, at the mobile telephone, audio output signal representative of a predetermined keyword or phrase; and transmitting the audio output signal to the telemarketer call system.

5. A method, comprising:

receiving, by a communication device, a request from a caller device to establish a connection associated with a communication address;

sending, by the communication device, the communication address to a remote computing device;

receiving, by the communication device, caller information from the remote computing device;

accepting, by the communication device, the request from the caller device;

receiving, by the communication device, an audio input signal from the caller device;

displaying, by the communication device, a first selectable indicia representative of a first option to terminate the call and to send a report to the remote computing device that the caller device is associated with a specific entity;

displaying a second selectable indicia representative of a second option to record at least a portion of the audio input signal;

determining from at least the portion of the audio input signal that the connection is related to an approved activity; and sending at least the portion of the audio input signal to the remote computing device.

6. The method of claim 5, wherein the accepting comprises:

generating challenge-response information including a challenge having a unique solution representing an expected response to the challenge;

sending, to the caller device, an audio output signal indicative of the challenge;

receiving, from the caller device, a second audio input signal indicative of a response to the challenge; and validating the response at the communication device.

7. The method of claim 5, further comprising:

receiving, by the communication device, a selection of the second selectable indicia; and recording at least the portion of the audio input signal.

8. The method of claim 7, further comprising:

determining from at least the portion of the audio input signal that the connection is related to a fraudulent business activity associated with the caller device; and sending at least the portion of the audio input signal to a second remote computing device.

9. The method of claim 7, further comprising:

generating, from the audio input signal, an audio segment that lacks identifying information of an end-user of the communication device, and sending the audio segment to the remote computing device.

10. The method of claim 5, further comprising:

terminating a call between the caller device and the communication device; and displaying actionable indicia comprising one or more fillable fields to input information representative of the connection.

11. The method of claim 5, further comprising:

displaying a third selectable indicia representative of a third option to report a communication address in a historical record of calls of the communication device.

12. A device, comprising:

at least one more memory device having instructions encoded thereon;

at least one processor functionally coupled to the at least one memory device and configured, by the instructions, to at least:

receive a request from a caller device to establish a connection using a communication address;

send the communication address to a remote computing device;

receive caller information from the remote computing device;

accept the request from the caller device;

receive audio input signal from the caller device;

display a first selectable indicia representative of a first option to terminate the connection and to send a report to the remote computing device that the caller device is associated with a specific entity;

display a second selectable indicia representative of a second option to record at least a portion of the audio input signal;

determine from at least the portion of the audio input signal that the connection is related to an approved activity; and send at least the portion of the audio input signal to the remote computing device.

13. The device of claim 12, wherein the at least one processor is further configured, by the instructions, to send, to the caller device, an audio output signal indicative of a challenge in the challenge-response information;

to receive, from the caller device, a second audio input signal indicative of a response to the challenge; and to validate the response.

14. The device of claim 12, wherein the at least one processor is further configured, by the instructions, to receive a selection of the second selectable indicia; and to record at least the portion of the audio input signal.

15. The device of claim 14, wherein the at least one processor is further configured, by the instructions, to determine from at least the portion of the audio input signal that the connection is related to a fraudulent business activity associated with the caller device; and to send at least the portion of the audio input signal to a second remote computing device.

16. The device of claim 12, wherein the at least one processor is further configured, by the instructions, to display a third selectable indicia representative of a third option to report a communication address in a historical record of calls of the communication device.

17. The device of claim 12, wherein the at least one processor is further configured, by the instructions, to terminate the connection between the caller device and the communication device; and to display actionable indicia comprising one or more fillable fields to input information representative of the connection.

\* \* \* \* \*